Oct. 27, 1936.  E. O'MALLEY  2,058,715
METHOD OF RESURFACING VALVE SEATS
Original Filed April 25, 1934
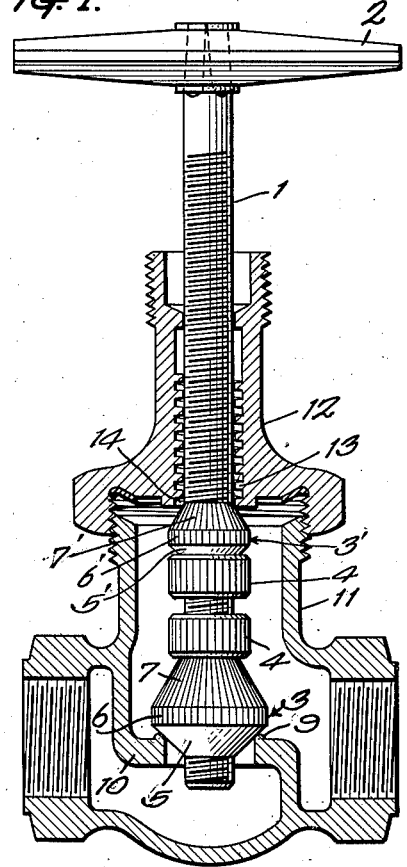
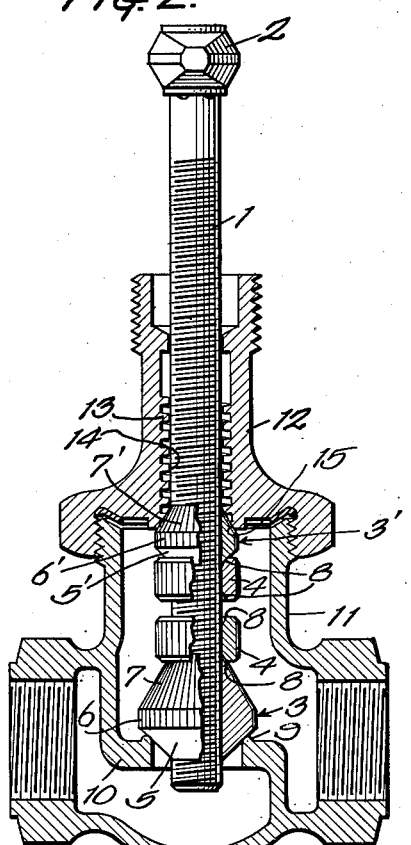
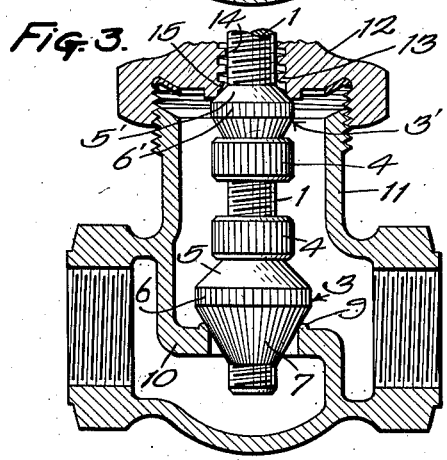
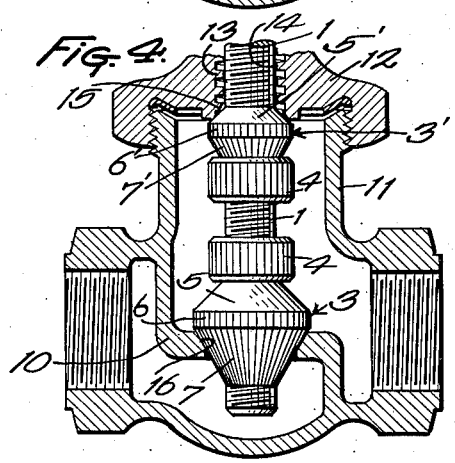
INVENTOR:
EDWARD O'MALLEY
BY Langan Moon
ATTY.

Patented Oct. 27, 1936

2,058,715

UNITED STATES PATENT OFFICE 2,058,715

METHOD OF RESURFACING VALVE SEATS

Edward O'Malley, Chicago, Ill., assignor of one-third to James G. McNeil and one-third to Edward W. O'Malley, both of Chicago, Ill.

Original application April 25, 1934, Serial No. 722,224, now Patent No. 2,011,688, dated August 20, 1935. Divided and this application March 5, 1935, Serial No. 9,446

3 Claims. (Cl. 29—157.1)

This invention relates to improvements in methods of resurfacing valve seats and this application is a division of this applicant's co-pending application, Serial No. 722,224, filed April 25, 1934, issued as Patent No. 2,011,688 on August 20, 1935.

It is an object of this invention to provide a simple, easy and effective method of resurfacing of the seats of valves worn by constant use. This improved method is disclosed in said parent application in connection with a particular tool provided for this purpose, and while other tools may be employed, the operation of this method is demonstrated herein, as shown upon the accompanying sheet of drawing in connection with the tool claimed in said parent application.

In the drawing:

Figure 1 is a view partly in longitudinal, vertical, central section through a bonnet valve, illustrating in elevation the resurfacing tool in elevation in the position assumed at the beginning of the first step in carrying out this improved method.

Figure 2 is a similar view showing the parts at the end of the first step.

Figure 3 is a fragmentary view of Figure 1, illustrating the beginning of the second step.

Figure 4 is a view similar to Figure 3 showing the end of the second step.

Figure 1 illustrates a preferred tool which may be employed in carrying out this invention, which includes a reamer spindle 1 threaded throughout except where the upper end is tapered to be centrally received and engaged by an operating handle 2 and with a plurality of combined reaming and centering elements 3, 3' and jam nuts 4 threaded thereon.

Each combined reaming and centering elements 3 and 3' is preferably formed of hardened steel axially drilled and tapped to fit over the threaded spindle 1 and includes a conical smooth centering surfaces 5 and 5' departing from the spindle at an angle, substantially 45°, and terminating in narrow cylindrical knurled surfaces 6 and 6' with conical reaming surfaces 7 and 7' departing from the other side thereof to meet the threaded spindle 1 at an angle thereto, preferably at an angle of substantially 30° to the spindle axis. The reaming surfaces 7 and 7' are preferably knurled or milled. To accommodate this tool to valve seats of different sizes a plurality of combined reaming and centering elements 3 and 3' are provided in which the diameter of the cylindrical surfaces 6 and 6' are graduated whereby the element having reaming surfaces of proper size may be selected to reseat the desired valve.

In the operation of the improved tool, the combined reaming and centering elements are employed in pairs secured in their adjusted position by the cam nuts 4. It is preferable to provide the opposite flat surfaces of the jam nuts 4 about the bore with a conical recess 8 to receive and bear against the conical surface of the element 3 when engaged therewith.

The figures illustrate a commercial globe valve in which the seat 9 is provided in the diaphragm 10 of the casing 11, which mounts the usual threaded bonnet 12 and threaded packing nut, not shown.

The bodies 11 and bonnets 12 of valves of this type are of cast metal and therefore the edges of the openings therethrough are rough and of uneven contour, and this is especially true in bonnets provided with a threaded aperture for operatively receiving a threaded valve stem. This type is illustrated by the bonnet 11 and such bonnets are customarily provided with deep rectangular threads 13, as shown in Figure 1, which form an oblong curved or elliptical opening 14 upon the interior of the bonnet so that upon the application of a reaming or seat resurfacing tool having a conical guide to engage the interior bonnet aperture for centering the tool upon the application of force will cause the conical guide to upset the edges of the rectangular threads 13 about the opening to such an extent that the valve stem may not be replaceable therein. Therefore, in preforming the steps of this method, the guiding surface 5 of the lower element 3 is arranged to bear upon the valve seat 9 and the reaming surface 7 of the upper element to bear upon the bonnet. The bonnet with the valve stem and packing nut is removed from the casing 11, the valve stem and packing nut removed from the bonnet, the tool with the elements as above described inserted, and the bonnet 12 placed over the spindle 1 and partially threaded upon the casing 11 with the smooth conical surface 5 of the lower element 3 centered upon the valve seat and the reaming surface 6' of the upper element engaging the bonnet opening 14, as shown in Figure 1. As the tool is rotated the body of the bonnet about the opening 14 is fed upon the reaming surface 7' of the upper element 3' by the threading of the bonnet 12 upon the casing 11 until a satisfactory guiding surface has been produced, as shown in Figure 2. This completes the first step of this improved method. The bonnet 12 is then removed from the casing and from the tool.

The elements 3 and 3' are removed from the spindle 1 and after turning the elements 3 and 3' to reverse the relation of their conical surfaces are replaced and secured by the jam nuts 4 upon the spindle 1 and the bonnet 12 again placed over the spindle with the elements 3 and 3' within the casing 11 and the bonnet partially threaded thereon to cause the reaming surface 7 of the lower element 3 to contact the valve seat 9 with the smooth conical surface 5' of the upper element 3' received in and guided by the reamed conical recess 15, formed by the first step, about the bore of the bonnet 12, as shown in Figure 3, and the spindle 1 rotated by the handle 2 to resurface the valve seat, as at 16. During this operation, the reamer is fed upon the valve seat by further threading of the bonnet 12 upon the casing 11.

From the foregoing, it is seen that this improved method of resurfacing valve seats provides a true centering surface in the bonnet for the resurfacing tool preparatory to resurfacing the valve seat and thereby insures the provision of a true resurfaced valve seat. While this method is illustrated in connection with a bonnet valve, it may be applied to faucets or other types of valves without departing from the scope thereof.

What I claim is:

1. The method of resurfacing the seats of valves having a detachable part provided with a threaded aperture to receive a valve stem consisting in reaming a guiding surface upon the interior of the detachable part about and concentric to the threaded valve stem aperture and then reaming the valve seat employing the guiding surface first provided to center the seat reamer.

2. The method disclosed in claim 1 which includes the utilization of the valve seat to center the reaming of the said guiding surface.

3. The method of resurfacing the seats of valves having a removable bonnet provided with a threaded aperture receiving a valve stem consisting in removing the bonnet from the valve casing and the valve stem from the bonnet, substituting a reaming spindle for the valve stem, replacing the bonnet, guiding and centering the bottom of the spindle in the valve seat and reaming a central guiding surface upon the interior and about the valve stem receiving aperture, removing the bonnet and reaming devices, reversing said devices upon the spindle, replacing the bonnet and with the spindle guided and centered in the surface reamed in the bonnet reaming the valve seat to resurface it.

EDWARD O'MALLEY.